United States Patent
Kato (10) Patent No.: US 7,037,873 B2
(45) Date of Patent: May 2, 2006

(54) FUEL CELL ELECTROCATALYST AND METHOD OF PRODUCING THE SAME

(75) Inventor: Hisao Kato, Nisshin (JP)

(73) Assignee: Toyota Jicosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/670,600

(22) Filed: Sep. 26, 2003

(65) Prior Publication Data

US 2004/0067847 A1    Apr. 8, 2004

(30) Foreign Application Priority Data

Oct. 4, 2002    (JP)    ............... 2002-292428

(51) Int. Cl.
*B01J 21/18* (2006.01)
*B01J 23/00* (2006.01)
*B01J 23/40* (2006.01)
*B01J 23/74* (2006.01)
*H01M 4/86* (2006.01)

(52) U.S. Cl. ............... 502/180; 502/182; 502/185; 429/40; 429/41; 429/42; 429/43; 429/44

(58) Field of Classification Search ............ 429/40–44; 502/182, 185
See application file for complete search history.

(56) References Cited

U.S. PATENT DOCUMENTS

| | | | |
|---|---|---|---|
| 5,316,990 A | 5/1994 | Cooper et al. | |
| 6,036,827 A * | 3/2000 | Andrews et al. | 204/252 |
| 6,040,077 A | 3/2000 | Debe et al. | 429/40 |
| 6,066,410 A * | 5/2000 | Auer et al. | 429/40 |
| 6,649,300 B1 * | 11/2003 | Ito et al. | 429/44 |
| 2002/0004452 A1 * | 1/2002 | Abdo et al. | 502/332 |
| 2003/0068544 A1* | 4/2003 | Cisar et al. | 429/40 |
| 2004/0013935 A1* | 1/2004 | Ye et al. | 429/44 |

FOREIGN PATENT DOCUMENTS

| | | |
|---|---|---|
| DE | 197 56 880 A1 | 7/1999 |
| EP | 1 079 452 A1 | 2/2001 |
| EP | 0 952 241 B1 | 9/2001 |
| JP | 09/153366 | 6/1997 |
| JP | 2000-012043 | 1/2000 |
| JP | 2001-283867 | 10/2001 |
| WO | WO 00/55928 | 9/2000 |

* cited by examiner

*Primary Examiner*—J. A. Lorengo
*Assistant Examiner*—Patricia L. Hailey
(74) *Attorney, Agent, or Firm*—Finnegan, Henderson, Farabow, Garrett & Dunner, LLP (57) ABSTRACT

In an aspect of the invention, a fuel cell electrocatalyst comprises a carrier and a catalyst layer made of a Pt—Ru alloy supported on the carrier, and having the oxygen content of 4.4 wt % or less. Moreover, a value of the amount of oxygen that exists in one layer of the outermost surface of a component atom of the catalyst layer is 14.1% or less. Furthermore, in another aspect of the invention, a method of producing the fuel cell electrocatalyst comprises a supporting step of supporting a catalyst layer made of an alloy including Pt and Ru on a carrier, and an oxygen content regulating step of regulating the oxygen content of the catalyst layer.

9 Claims, 4 Drawing Sheets

FUEL CELL ELECTROCATALYST AND METHOD OF PRODUCING THE SAME

INCORPORATION BY REFERENCE

The disclosure of Japanese Patent Application No. 2002-292428 filed on Oct. 4, 2002 including the specification, drawings and abstract is incorporated herein by reference in its entirety.

BACKGROUND OF THE INVENTION

1. Field of Invention

The invention relates to a fuel cell electrocatalyst and a method of producing the same, and particularly to a fuel cell electrocatalyst with an excellent carbon monoxide poisoning resistance (CO poisoning resistance), and a method of producing the same.

2. Description of Related Art

A polymer electrolyte fuel cell (PEFC) has a high power density, operates at low temperatures, and emits little exhaust gas that contains a hazardous substance, and therefore noted as an energy source of transportation means that takes the place of a conventional internal combustion engine.

The PEFC is constructed by joining an anode to one face of a solid polymer electrolyte membrane and a cathode to the other face. For example, when hydrogen as fuel is supplied to the anode and oxygen as an oxidizing agent is supplied to the cathode, the fuel is oxidized to proton at the anode while the oxygen is reduced to water at the cathode, thereby generating electric power. For both anode and cathode, a fuel cell electrocatalyst made of fine powder with a precious metal such as Pt supported on a carrier such as carbon is used.

In practice, hydrogen used in the PEFC is obtained by reforming gasoline, methane, methanol, and the like. In a reforming reaction, carbon monoxide (CO) is generated together with hydrogen. The catalyst is deteriorated by such CO (poisoned by CO), and an electric power generation voltage of the PEFC is reduced. However, it is considerably difficult to completely eliminate CO from hydrogen obtained by reforming.

It is proposed to use a Pt—Ru alloy as a catalyst that is less susceptible to an adverse effect caused by a certain amount of CO residue, and has an excellent resistance against CO poisoning. With regard to a method of producing a fuel cell electrocatalyst that carries a Pt—Ru alloy, a carrier such as carbon powder is brought into contact with a solution including positive ions of Pt and Ru to adsorb the positive ions on the carrier, and the carrier is then heated in a reducing atmosphere to reduce the positive ions. Consequently, a fuel cell electrocatalyst having the catalyst layer including a Pt—Ru alloy supported on a carrier can be produced. For example, a method of producing a catalyst by reducing metals of Pt and Ru in order in a reducing airflow of hydrogen gas or the like is disclosed (Japanese Patent Laid-Open Publication No. 9-153366).

Conventionally, various studies have been made with respect to a catalyst using a Pt—Ru alloy in order to further improve a CO poisoning resistance. For example, a proper combination of Pt and Ru is disclosed (Japanese Patent Laid-Open Publication No. 2000-12043). Moreover, a method of producing a high-performance catalyst having a high CO poisoning resistance, with a Pt—Ru alloy supported in small amounts, is disclosed (Japanese Patent Laid-Open Publication No. 2001-283867) on the basis of results of testing various combinations of positive ions including Pt and positive ions including Ru.

However, the performance of a conventional catalyst using Pt—Ru alloy was not sufficient, thus requiring further improvement of the performance. Particularly, a further improvement of the CO poisoning resistance was required when the catalyst is used as an anode catalyst for a gas-reforming type fuel cell.

SUMMARY OF THE INVENTION

It is an object of the invention to provide a fuel cell electrocatalyst with an excellent CO poisoning resistance, and a method of producing the same.

As a result of extensive researches conducted to solve the problems described above, the inventor focused on a relation between a CO poisoning resistance and the amount of oxygen contained in a Pt—Ru alloy. This is because the Pt—Ru alloy has a high affinity for oxygen, and therefore, it can be assumed that, once oxidized, it is difficult to reduce the Pt—Ru alloy to a metal state under an operating condition of a PEFC. It can be considered that when Pt and Ru are brought into an oxidized state, electron states thereof change, affecting the performance of a catalyst. That is, the changes in electron states are considered to bring a change in an affinity for CO.

Therefore, an influence of the oxygen content of a fuel cell electrocatalyst on a catalytic activity was studied. As a result, as will be described later, it was found that the CO poisoning resistance increases when the oxygen content is 4.4 wt % or less. Conventionally, an influence of the oxygen content of a Pt—Ru alloy on the CO poisoning resistance has never been considered.

In an aspect of the invention, a fuel cell electrocatalyst comprises a carrier and a catalyst layer made of a Pt—Ru alloy supported on the carrier and having an oxygen content of 4.4 wt % or less.

Furthermore, in another aspect of the invention, a fuel cell electrocatalyst comprises a carrier and a catalyst layer made of a Pt—Ru alloy supported on the carrier, in which a value of the content of oxygen that exists in one layer of an outermost surface of a component atom is 14.1% or less.

In yet another aspect of the invention, a method of producing a fuel cell electrocatalyst that solves the problems described above comprises a supporting step of supporting a catalyst layer made of an alloy that includes Pt and Ru on the carrier, and an oxygen content regulating step of regulating the oxygen content of the catalyst layer.

That is, by regulating the oxygen content of a catalyst layer having a Pt—Ru alloy to a proper value, a fuel cell electrocatalyst with an excellent CO poisoning resistance can be obtained. In specific, a preferable oxygen content is 4.4 wt % or less with reference to the catalyst layer.

As a method of regulating the oxygen content, it is preferable to support a catalyst layer on a carrier and then eliminate oxygen from the catalyst layer. That is, the oxygen content regulating step is preferably a step of eliminating oxygen from the catalyst layer. With this step, even after the Pt—Ru alloy is brought into an oxidized state, a fuel cell electrocatalyst with a high CO poisoning resistance can be obtained by eliminating oxygen.

Furthermore, as a result of the investigation, it was proved that the Pt—Ru alloy was oxidized when heated in an oxidizing atmosphere in which, for example, contact with oxygen occurs. Particularly, when the Pt—Ru alloy was brought into contact with oxygen under a heating condition of room temperature or higher, the progress of an oxidizing reaction that affects the CO poisoning resistance of the catalyst was observed. Here, the supporting step may include a heating step of heating the Pt—Ru-supported fuel cell electrocatalyst mentioned above, in such cases as reducing the catalyst layer supported on the carrier to a metal, or drying the Pt—Ru-supported fuel cell electrocatalyst. In these cases, the oxygen content regulating step is preferably a step of keeping the Pt—Ru-supported fuel cell electrocatalyst in a non-oxidizing atmospheric state in the heating step. That is, under a condition in which a Pt—Ru alloy is likely to be oxidized, the Pt—Ru-supported fuel cell electrocatalyst is kept in the non-oxidizing state, thereby preventing oxidization of the Pt—Ru alloy.

The non-oxidizing atmospheric state in the oxygen content regulating step may be a state in which a non-oxidizing substance is adsorbed on a surface of the catalyst layer. By temporarily protecting the surface of the Pt—Ru alloy by the non-oxidizing substance, oxidization of the Pt—Ru alloy is prevented, thereby increasing the CO poisoning resistance.

Furthermore, the oxygen content regulating step including the heating step is preferably a step of keeping the catalyst layer in the non-oxidizing atmospheric state at least when the temperature of the catalyst is room temperature or higher. By keeping the Pt—Ru alloy in the non-oxidizing state at least under a condition in which the Pt—Ru alloy is likely to be oxidized (the temperature of the catalyst is room temperature (30° C.) or higher), the CO poisoning resistance can be increased.

DETAILED DESCRIPTION OF PREFERRED EMBODIMENTS (A Fuel Cell Electrocatalyst)

A fuel cell electrocatalyst of the invention comprises a carrier and a catalyst layer with a Pt—Ru alloy supported on the carrier.

The material of the carrier is not particularly specified, however, it is preferably a conductive material having an excellent oxidation-reduction resistance such as a carbon powder including carbon black and acetylene black and a carbon material including carbon fiber. In addition, the shape of the carrier is not particularly specified, however, it is preferably in the form of a powder having a small particle diameter or a fiber having a small diameter in order to increase the surface area. Moreover, the particle diameter of the carrier is not particularly specified, however, it is preferably approximately 0.01 to 10 µm in terms of simultaneously achieving an increase of a specific surface area and prevention of particle aggregation.

The catalyst layer may include a Pt—Ru alloy. In addition, the catalyst layer may also include a metallic element other than Pt and Ru, for example, a precious metal such as Pd, Os, Ir, Rh, Ag, and Au, and a base metal such as Ti, V, Cr, Mn, Fe, Co, Ni, Cu, Zn, Nb, Mo, and W. Moreover, the catalyst layer may be made of a Pt—Ru alloy only. Although the ratio between Pt and Ru is not particularly specified, it is preferably approximately 90:10 to 30:70, particularly approximately 40:60, in the ratio of the number of atoms. By controlling the ratio of the number of atoms within this range, a crystal structure in which Ru is dissolved in a crystal particle of Pt is obtained, and thus the CO poisoning resistance can be increased while maintaining activity of Pt.

Preferably, the catalyst layer includes fine particles of Pt—Ru alloy in terms of the utilization efficiency of a precious metal that constitutes the catalyst layer. The particle diameter of the fine particle is preferably approximately 2 to 5 nm or less to suppress particle aggregation. Within this range, an absolute amount (density) of Pt—Ru alloy supported can be obtained, and a specific surface area can be increased, thereby improving the utilization efficiency of the precious metal that constitutes the catalyst layer.

The ratio between the carrier and the catalyst layer is not particularly specified. For example, the ratio of the carrier to the catalyst layer may be approximately 40:60 in mass ratio. A method of supporting the catalyst layer on the carrier is not particularly specified. For example, a method of forming the catalyst layer by immersing the carrier into a solution that includes metallic element ions constituting the catalyst layer and thereafter reducing the metallic element ions, and a method of physically supporting metallic elements constituting the catalyst layer on the carrier (PVD and the like) may be adopted. The former method will be described later in detail.

Furthermore, the oxygen content in the fuel cell electrocatalyst of the invention is 4.4 wt % or less. Further preferably, the oxygen content is 4.2 wt % or less. The oxygen content is controlled with reference to the mass of the catalyst layer. The oxygen content can be measured generally by a method referred to as an O/N elementary analysis. In specific, the amount of oxygen-containing gas in gas generated by heating the fuel cell electrocatalyst in helium gas and melting a Pt—Ru alloy, is determined. The amount of oxygen is determined based on the wavelength band of infrared rays absorbed by oxygen (a thermal conductivity analysis is used in the case of nitrogen). Also, with regard to a carrier not carrying a catalyst layer (for example, a carrier from which a catalyst layer is eliminated), which is used as a control sample, the oxygen content thereof is measured in the same manner to derive the amount of oxygen contained in the catalyst layer.

The fuel cell electrocatalyst of the invention can be used as anode and cathode electrodes of a fuel cell after dispersed into solid polymer electrolyte such as Nafion. Particularly, the fuel cell electrocatalyst is preferably applied to an anode electrode which has a high risk of CO contamination. Moreover, by keeping this fuel cell electrocatalyst in the non-oxidizing atmosphere until it is applied to an electrode of the fuel cell, introduction of oxygen is prevented, thereby allowing a higher CO poisoning resistance to be maintained. Therefore, it is possible to provide a fuel cell capable of exhibiting a sufficient electric power generation voltage even if hydrogen produced by reforming gasoline or methanol is used as fuel.

(A Method of Producing the Fuel Cell Electrocatalyst)

A method of producing the fuel cell electrocatalyst of the invention comprises a supporting step and an oxygen content regulating step. The supporting step is a step of supporting a catalyst layer on a carrier. The oxygen content regulating step is a step of regulating the oxygen content of the catalyst layer supported on the carrier. Here, the carrier and the catalyst layer are the same as those of the aforementioned fuel cell electrocatalyst, and thus, descriptions thereof will be omitted.

(The Supporting Step)

The supporting step is not particularly specified as long as the catalyst layer can be supported on the carrier. Examples of such a method include: (1) a method of preparing a catalyst layer by making a carrier come in contact with a solution that includes ions of elements (Pt, Ru, and the like) constituting the catalyst layer to adsorb the ions of the elements on the carrier, and thereafter keeping the carrier with the ions adsorbed thereon in a reducing atmosphere to reduce the ions adsorbed on the carrier to original metals such as Pt and Ru; (2) a method of supporting a catalyst layer directly on a carrier by immersing the carrier into a solution that includes the ions of the elements and reducing the ions of the elements in the solution; and (3) a method of supporting metallic elements, as they are, constituting a catalyst layer on a carrier by a physical method.

In specific, method (1) has an impregnating step of impregnating a carrier with positive ions of metallic elements constituting a catalyst layer, and a reducing step of reducing the positive ions of the metallic elements impregnated into the carrier to form a catalyst layer made of metals. Methods that can be adopted as the impregnating step include an evaporation-to-dryness method of immersing the carrier into a solution including positive ions and then drying solvent of the immersion solution, an equilibrium adsorption method of adhering positive ions in a solution to the carrier until an equilibrium state is established, a spraying method of directly spraying and drying a solution including positive ions to the carrier, and other methods. In the reducing step, a carrier on which positive ions are adsorbed is brought in contact with gas having a reducing property such as hydrogen gas, thereby reducing the positive ions to metals. In this case, a reducing reaction of reducing positive ions to metals is efficiently facilitated by adopting a heating step of heating the carrier. In specific, by drying the carrier impregnated with the positive ions and executing hydrogen gas phase reduction at approximately 300 to 800° C. for approximately 1 to 10 hours (burning in a tube furnace in which hydrogen flows, for example), the positive ions can be reduced to metals, and a catalyst layer made of an alloy having catalytic activity can be supported on the carrier.

Specifically, according to method (2), metallic fine particles are deposited and supported on a carrier by immersing the carrier into a solution including positive ions of metallic elements constituting a catalyst layer and then reducing the positive ions. A method of reducing the positive ions includes a chemical method of adding a reducing agent, a physical method of reducing by, for example, heating a solution, a combination of both methods, and the like.

Furthermore, it is preferable to mix water into a solution including positive ions of metallic elements before mixing a reducing agent, so as to deposit oxide fine particles of Pt, Ru, and the like. For example, when a hexahydroxo Pt nitric acid solution is used as a Pt precursor (a solution including Pt positive ions), nitric acid is hydrolyzed by adding water, and colloid particles of a Pt oxide are generated, forming fine particles. Moreover, in addition to water (or instead of water), by adding acid such as nitric acid and acetic acid, or organic solvent such as alcohol, acetone, and chloroform, favorable effects that the dispersibility of a carrier such as carbon powder can be improved and the particle diameter of a generated metal oxide fine particle can be controlled are obtained.

The reducing agent is not particularly specified, and a normal reducing agent can be used in normal amount. Examples of such a reducing agent include hydride such as sodium borohydride, hydrogen, nonmetal ions or acid (such as formic acid (soda)), alcohol such as ethanol, lower oxide and lower oxygen salt, hydrazine, or aldehyde such as formaldehyde. Moreover, of the aforementioned agents, alcohol, formic acid, hydrazine, and the like are capable of promptly reducing an oxide of Pt, Ru, and the like by being added as a reducing agent and then heated. A carrier on which both metals are supported as described above is filtered, dried, and so on. For quick drying, the heating step may be provided.

Examples of a solution including positive ions used in methods (1) and (2) will be described. Examples of solutions that include positive ions of Pt and Ru among metallic elements constituting the catalyst layer, include a Pt precursor solution such as a hexahydroxo Pt nitric acid solution, a dinitrodiamino Pt nitric acid solution, a hexahydroxo Pt nitric acid solution, a Pt ammine solution such as a divalent Pt ammine solution and a quadrivalent Pt ammine solution, and a nitric acid Pt solution, and an Ru precursor (a solution including Ru positive ions) such as an Ru chloride solution and a nitric acid Ru solution.

A carrier is immersed into a solution in which the Pt precursor solution and the Ru precursor solution are mixed at a proper ratio so as to achieve the target Pt/Ru ratio. The carrier is the same as that explained in the description of the aforementioned fuel cell electrocatalyst.

Furthermore, by providing, as necessary, a heating step in which both of the metals carried on the carrier as described above are heated to be alloyed, a catalyst layer can be formed. The heating step in alloying is not particularly specified, and may be performed by a method normally used for alloying. For example, a carrier that carries the Pt and Ru obtained may be kept in a non-oxidization atmosphere (such as a reducing gas (for example, $H_2$) atmosphere and an inert atmosphere) at a temperature of approximately 300 to 800° C. for approximately 1 to 10 hours. By applying such a heat treatment, Pt and Ru supported on the carrier are alloyed to form a catalyst layer.

(The Oxygen Content Regulating Step)

The oxygen content regulating step regulates the oxygen content of a catalyst layer supported on a carrier. In specific, the oxygen content of the catalyst layer is preferably regulated to 4.4 wt % or less with reference to the catalyst layer. Furthermore, it is preferable to regulate the oxygen content to 4.2 wt % or less.

Specifically, a method of regulating the oxygen content of the catalyst layer is not particularly specified, and, for example, a method of eliminating oxygen from the catalyst layer can be adopted. As a method of eliminating oxygen, a method of causing reaction by an operation of, for example, heating the carrier carrying the catalyst layer together with a reducing agent such as hydrogen or a liquid-phase reducing agent (nonmetal ions or acid (such as formic acid (soda)), alcohol such as ethanol, lower oxide and lower oxygen salt, hydrazine, aldehyde such as formaldehyde, and the like) can be adopted. Moreover, a method of reducing the catalyst layer by an electrochemical method to eliminate oxygen can be adopted.

In a case where the aforementioned supporting step includes the heating step, the oxygen content regulating step includes a method of keeping the catalyst layer in the non-oxidizing atmospheric state. For example, when the carrier that carries the catalyst layer is heated to regulate alloying, the catalyst layer is kept in the non-oxidizing atmospheric state during heating, and also even during cooling after heating.

Particularly, by keeping the catalyst layer in the non-oxidizing atmospheric state in a case where the catalyst layer is heated to room temperature (30° C.) or higher in the heating step, an increase in the oxygen content of the catalyst layer can be suppressed, thereby allowing the oxygen content of the catalyst layer to be adjusted low. Furthermore, the 'non-oxidizing atmospheric state' is preferably a 'reducing atmospheric state.'

A method of keeping the catalyst layer in the non-oxidizing atmospheric state includes a method of keeping the catalyst layer in non-reactive gas such as nitrogen and argon, and a method of adsorbing a non-oxidizing substance, that can be eliminated easily and has a higher affinity for the catalyst surface than oxygen of $H_2O$, CO, and the like, on the surface of the catalyst layer.

In this case, the catalyst layer is preferably kept in the non-oxidizing atmospheric state until it is applied to a fuel cell regardless of the temperature of the catalyst layer. Since it is preferable that the oxygen content of the catalyst layer is low, the progress of oxidization is preferably prevented as much as possible.

[A relation between the particle diameter of a fine particle made of a Pt—Ru alloy that is present in a catalyst layer and an allowable oxygen content]

(1) According to the invention, a CO poisoning resistance of a catalyst layer depends on the surface state of a fine particle made of a Pt—Ru alloy that is present in the catalyst layer, that is, the oxygen content of the surface of the fine particle. In other words, when the oxygen content with respect to atoms that exist on the surface of the fine particle is equal to or less than a predetermined value, the CO poisoning resistance increases. The CO poisoning resistance depends little on the oxygen content inside the fine particle. The predetermined value will be described later.

(2) In this case, since Pt and Ru are dissolved in the Pt—Ru alloy, an oxygen atom hardly exists inside an alloy crystal. Therefore, in the Pt—Ru alloy, oxygen atoms are concentrated on the crystal surface compared to the inside of the alloy crystal. That is, the oxygen atoms included in the fine particle made of the Pt—Ru alloy of the catalyst layer are concentrated on the surface of the fine particle.

(3) Therefore, based on (1) and (2) above, the proper range of the oxygen content of the catalyst layer changes according to the particle diameter of the fine particle. That is, since a surface area per unit mass increases as the particle diameter of the fine particle is reduced, the oxygen content with respect to the volume of the fine particle increases relatively with a decrease in the particle diameter of the fine particle.

(4) In this case, by utilizing the fact that oxygen atoms can hardly exist inside the fine particle made of the Pt—Ru alloy, it is possible to calculate a relation in which the allowable oxygen content with respect to the entire fine particle made of the Pt—Ru alloy changes according to the particle diameter of the fine particle. According to this method, by analyzing the oxygen content of the entire particle, whether a fuel cell electrocatalyst is within the scope of the invention can be determined easily.

Specifically, a value of the allowable oxygen content with respect to the entire particle is calculated based on a value of the allowable oxygen content of one layer of the outermost surface of the fine particle made of the Pt—Ru alloy.

The value of the allowable oxygen content in one layer of the outermost surface of the fine particle can be calculated based on the abundance ratio of one layer of the outermost surface of the fine particle to the entire fine particle, and on a test result obtained in the example in which a particle diameter is 3.5 nm (the value of the allowable oxygen content with respect to the entire fine particle is 4.4% or less). The value of the allowable oxygen content changes according to the particle diameter. The following cases (5) and (6) respectively describes a case in which the shape of the fine particle made of the Pt—Ru alloy approximates a hemisphere, and a case in which the shape of the fine particle approximates a cube.

(5) A result of the example in which the shape of the fine particle made of the Pt—Ru alloy approximates a hemisphere showed that, when the particle diameter of the fine particle made of the Pt—Ru alloy is 3.5 nm, the oxygen content is preferably set to 4.4% or less with reference to the entire fine particle.

Therefore, in a case in which the particle diameter of the fine particle made of the Pt—Ru alloy is 3.5 nm, when calculating the abundance ratio of atoms that exist in one layer of the outermost surface to the total atoms (the number of atoms that exist in one layer of the outermost surface/the number of the total atoms), 31.2% (when the abundance ratio of Pt to Ru is 1:1, an average value of the distance between adjacent atoms is 2.73 Å) to 32% (when the abundance ratio of Pt to Ru is 1:0, the distance between adjacent atoms is 2.8 Å) can be obtained.

Based on this value, the allowable oxygen content with reference to one layer of the outermost surface excluding the Pt—Ru alloy inside the particle is calculated as 4.4%÷(31.2% to 32%)×100%=14.1% (when the abundance ratio of Pt to Ru is 1:1) to 13.8% (when the abundance ratio of Pt to Ru is 1:0).

Accordingly, by calculating the number and the abundance ratio of atoms that exist in one layer of the outermost surface corresponding to a particle diameter of the fine particle made of the Pt—Ru alloy, and introducing the maximum value 14.1% to 13.8% of the allowable oxygen content in the atoms that exist in one layer of the outermost surface, a value of the oxygen content allowed in the particle diameter can be calculated. That is, (allowable oxygen content)=(14.1% to 13.8%)×(abundance ratio of atoms in one layer of the outermost surface of the fine particle (%))÷100%.

A method of calculating the abundance ratio of atoms in one layer of the outermost surface will be described by an example below. At first, a volume V of an entire fine particle is calculated ($V=4\pi D^3/6$, where D is a particle diameter). By dividing the volume V by an average volume v per atom ($v=4\pi L^3/3$, where L is an average distance between adjacent atoms), the number N of atoms in the fine particle can be calculated.

Then, a surface area $S_T$ that is in contact with a gas phase of the fine particle is calculated ($S_T=\pi D^2/2$). By dividing the surface area $S_T$ by an average surface area a per atom ($a=\pi L^2/4$), a number $N_s$ of atoms in contact with the gas phase per fine particle can be calculated.

By dividing the number $N_s$ of atoms in contact with the gas phase (that is, the number of atoms that exist in one layer of the outermost surface) by the number N of the total atoms, the abundance ratio of atoms that exist in one layer of the outermost surface can be calculated.

(6) A result of the example when the shape of the fine particle made of the Pt—Ru alloy approximates a cube showed that, when the particle diameter of the fine particle made of the Pt—Ru alloy is 3.5 nm, the oxygen content is preferably set to 4.4% or less with reference to the entire fine particle.

Therefore, in a case in which the particle diameter of the fine particle made of the Pt—Ru alloy is 3.5 nm, when calculating the abundance ratio of atoms that exist in one layer of the outermost surface to the total atoms (the number of atoms that exist in one layer of the outermost surface/the number of the total atoms), 34.3% (when the abundance ratio of Pt to Ru is 1:1, an average value of the distance between adjacent atoms is 2.73 Å) to 35.1% (when the abundance ratio of Pt to Ru is 1:0, the distance between adjacent atoms is 2.8 Å) can be obtained.

Based on this value, the allowable oxygen content with reference to one layer of the outermost surface excluding the Pt—Ru alloy inside the fine particle is calculated as 4.4÷(34.3% to 35.1%)×100%=12.8% (when the abundance ratio of Pt to Ru is 1:1) to 12.5% (when the abundance ratio of Pt to Ru is 1:0).

Accordingly, by calculating the number and the abundance ratio of atoms that exist in one layer of the outermost surface corresponding to the particle diameter of the fine particle made of the Pt—Ru alloy, and introducing the maximum value 12.8% to 12.5% of the allowable oxygen content in the atoms that exist in one layer of the outermost surface, a value of the oxygen content allowed in the particle diameter can be calculated. That is, (allowable oxygen content)=(12.8% to 12.5%)×(abundance ratio of atoms that exist in one layer of the outermost surface of the fine particle (%))÷100%.

A method of calculating the abundance ratio of atoms that exist in one layer of the outermost surface will be described by an example below. At first, a volume V of an entire fine particle is calculated ($V=D^3$, where D is a particle diameter). By dividing the volume V by an average volume v per atom ($v=L^3$, where L is an average distance between adjacent atoms), a number N of atoms in the fine particle can be calculated.

Then, a number $N_s$ of atoms in contact with a gas phase of the fine particle is calculated ($N_s=5(D/L)^2-8D/L+4$: the total number of atoms that exist on five faces of the cube).

By dividing the number $N_s$ of atoms in contact with the gas phase (that is, the number of atoms that exist in one layer of the outermost surface) by the number N of the total atoms, the abundance ratio of atoms that exist in one layer of the outermost surface can be calculated.

(7) According to (5) and (6) above, a predetermined value allowed as the oxygen content with respect to atoms that exist on the surface of the fine particle is 14.1%, preferably 13.8%, more preferably 12.8%, and furthermore preferably 12.5%. In the present embodiment, when the oxygen content is equal to or less than the predetermined value with reference to atoms that exist in one layer of the outermost surface of the fine particle, a CO poisoning resistance is increased. The value of the oxygen content with respect to atoms that exist on the surface of the fine particle can be measured by XPS, XMA, SIMS, and the like.

Figure 1:
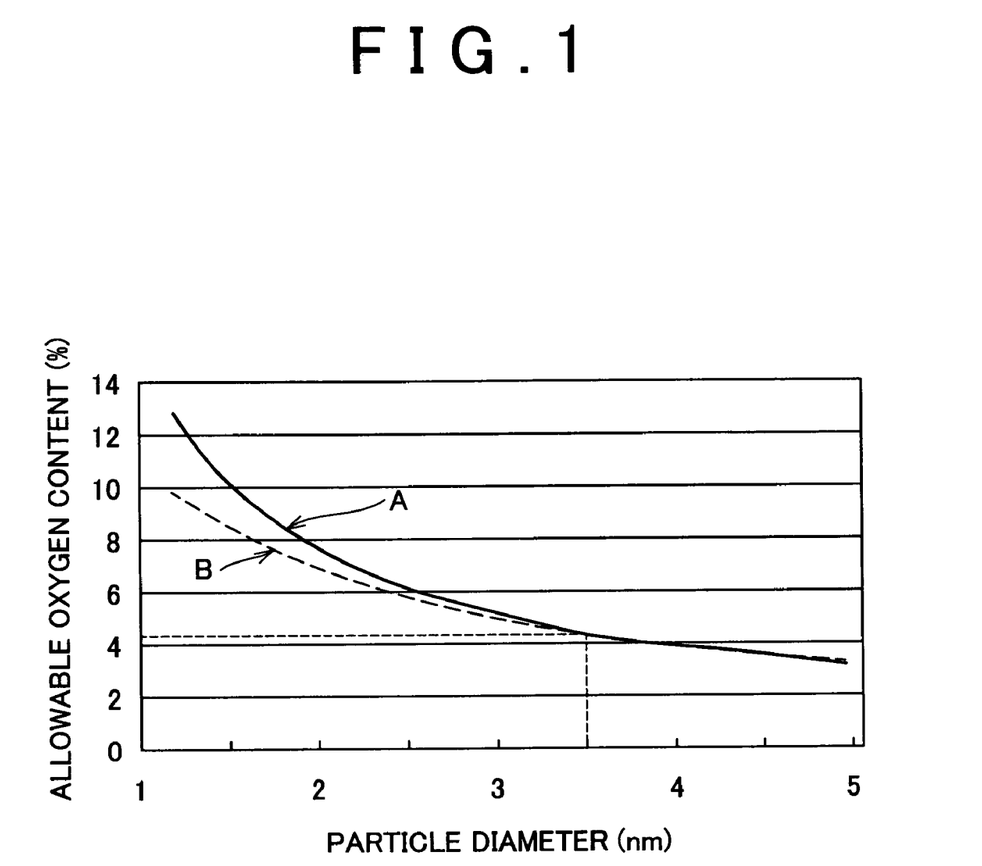
FIG. 1 is a graph that shows a relation between a particle diameter of a fine particle made of a Pt—Ru alloy of a catalyst layer and a range of the allowable oxygen content.

(8) FIG. 1 shows a relation between the value of the allowable oxygen content and the value of the particle diameter of the fine particle made of a Pt—Ru alloy, calculated based on (5) and (6) above. In FIG. 1, A (solid line) represents the case (5) in which the shape of the fine particle approximates a hemisphere, and B (broken line) represents the case (6) in which the shape of the fine particle approximates a cube. The portion below the curves indicated by A and B represents a range of the allowable oxygen content.

In the fine particle with a particle diameter of 3.5 nm that is made of the Pt—Ru alloy in the present example, the allowable oxygen content of the catalyst layer (only the Pt—Ru alloy in this case) is 4.4% or less, and the value of the allowable oxygen content of the catalyst layer also changes as the particle diameter is reduced.

[Preparation of Samples]

EXAMPLE 1

Figure 2:
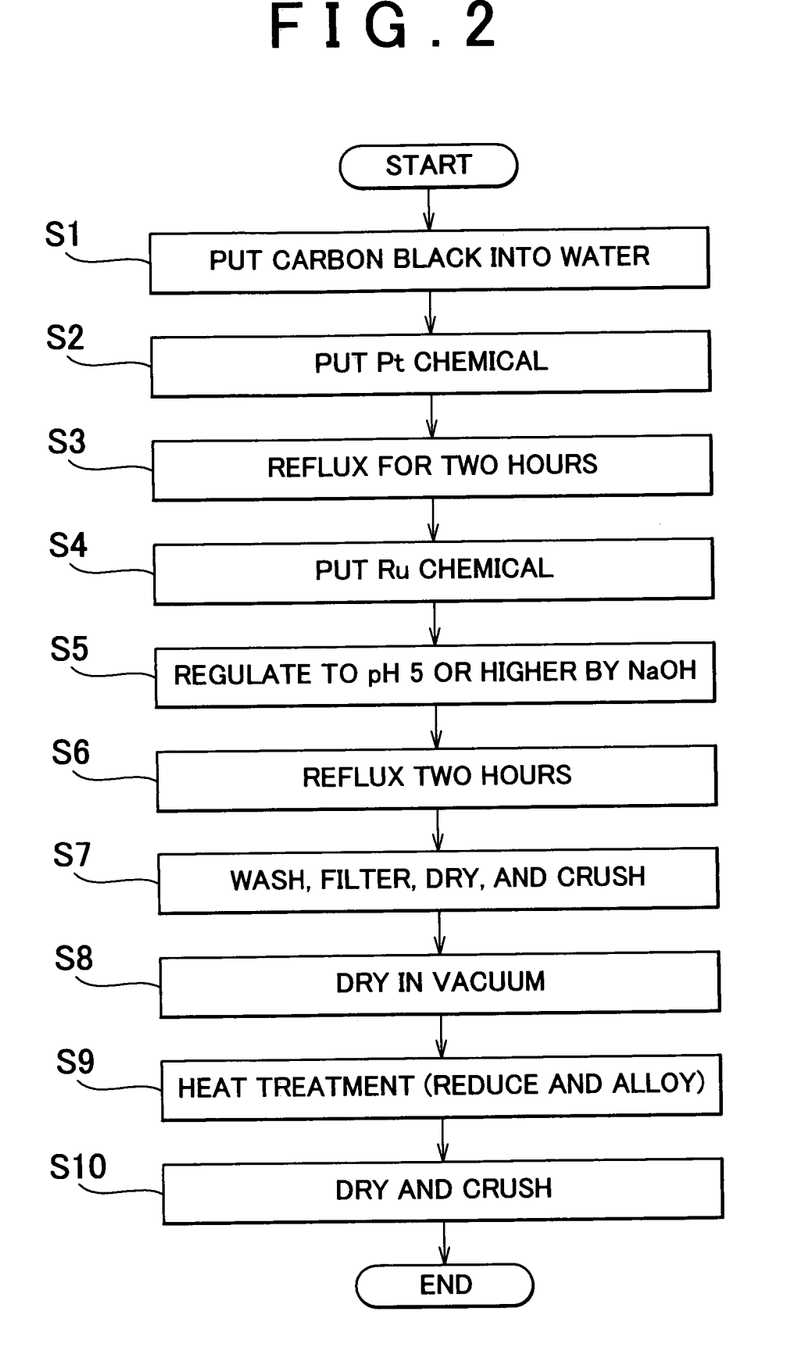
FIG. 2 is a flowchart that shows a method of preparing a test sample in an example.

A catalyst layer made of a Pt—Ru alloy is supported on carbon black which serves as a carrier by a method shown in FIG. 2 to prepare a fuel cell electrocatalyst which was used as a test sample of example 1. The specific procedures will be described below.

100 g of carbon black powder as a carrier was put into 10 L of water (S1). Then, a Pt ammine (hexahydroxy platinum nitric acid) solution including 2 to 3 wt % of platinum was added by the amount equivalent to 78.6 g of platinum (S2). After the mixture was refluxed for two hours (S3), a predetermined Ru chemical was added (S4). As the Ru chemical, an Ru chloride solution including 5 to 6 wt % of Ru was added by the amount equivalent to 59.6 g of Ru.

After the pH of the solution was adjusted to 7 or higher by a 5 wt % of sodium hydrate solution (S5), the mixture was refluxed again for two hours (S6). After that, a precipitate in the mixture was filtered, washed, dried, and then crushed to obtain catalyst powder (S7). Then, the catalyst powder was dried for four hours at 100° C. in a vacuum atmosphere as the non-oxidizing atmospheric state (S8). After drying, the catalyst powder thus obtained was exposed in the air.

Thereafter, a heat treatment was applied for four hours at 600° C. in a hydrogen atmosphere to reduce Pt and Ru and support a catalyst layer made of a Pt—Ru alloy on a carrier (S9). Then, the catalyst layer and the carrier were slowly cooled down to room temperature and dried in an inert atmosphere, and thereafter crushed to prepare a fuel cell electrocatalyst (S10). Pt and Ru were supported by 40 wt % with respect to the total mass of the catalyst prepared. After that, a heat treatment was applied for four hours at 100° C. in the vacuum atmosphere.

Alloy phases of fine particles constituting the catalyst layer supported on the carrier are identified by an X-ray diffractometer using a Cu α ray. As a result, the peaks of a Pt α solid solution phase of (111), (200) and (220) were detected. Moreover, a half band width was determined from the peak of (220) face to calculate the particle diameter. The calculated result was 3.5 nm.

EXAMPLE 2

A catalyst used as a test sample of example 2 was prepared by the same operation as in example 1, except that a nitrosyl nitrate Ru solution including 5 to 6 wt % of Ru was used as the Ru chemical added in step S4 by the amount equivalent to 59.6 g of Ru.

EXAMPLE 3

A catalyst used as a test sample of example 3 was prepared by the same operation as in example 1, except that the catalyst powder was kept in the non-oxidizing atmosphere and not exposed in the air after the drying process in step S8 before the heat treatment in step S9.

EXAMPLE 4

A catalyst used as a test sample of example 4 was prepared by the same operation as in example 2, except that the catalyst powder was kept in the non-oxidizing atmosphere and not exposed in the air after the drying process in step S8 before the heat treatment in step S9.

Comparative Exmple 1

A catalyst used as a test sample of comparative example 1 was prepared by the same operation as in example 1, except that slow-cooling and drying in step S10 were performed in the presence of air.

Comparative Example 2

A catalyst used as a test sample of comparative example 2 was prepared by the same operation as in example 2, except that slow-cooling and drying in step S10 were performed in the presence of air.

Comparative Example 3

A catalyst used as a test sample of comparative example 3 was prepared by the same operation as in example 3, except that slow-cooling and drying in step S10 were performed in the presence of air.

Comparative Example 4

A catalyst used as a test sample of comparative example 4 was prepared by the same operation as in example 4, except slow-cooling and drying in step S10 were performed in the presence of air.

[Measurement of the Oxygen Content]

An O/N elementary analysis was conducted on the test samples of the respective examples and comparative examples. An oxygen/nitrogen analyzer (EMGA650) produced by Horiba, Ltd was used in conducting the analysis. Specifically, the oxygen content in gas generated when Pt—Ru-supported carbon catalyst powder is melted by heating the respective test samples in He, was calculated by measuring the infrared rays of the wavelength band absorbed by oxygen. Also, carbon black used for the test samples as control samples was dried in vacuum and in the air, and the oxygen content thereof was measured for each condition (drying in vacuum: 3.75%, drying in the air: 4%). Then, the measured value was subtracted from the oxygen content of each test sample to derive the amount of oxygen contained in the catalyst layer. The results are shown in Table 1.

TABLE 1

|  | Oxygen content (wt %) | Pure hydrogen ratio (%) |
|---|---|---|
| Example 1 | 4.05 | 81.5 |
| Comparative example 1 | 4.40 | 67.3 |
| Example 2 | 3.87 | 82.4 |
| Comparative example 2 | 4.52 | 67.1 |
| Example 3 | 4.40 | 80.2 |
| Comparative example 3 | 4.75 | 62.5 |
| Example 4 | 4.12 | 78.0 |
| Comparative example 4 | 4.50 | 67.0 |

(Oxygen content)=(M−N)/{(M−N)+K}×100 (%)
K: the amount of Pt—Ru included in 1 g of Pt—Ru-supported carbon catalyst powder
M: the amount of oxygen contained in 1 g of Pt—Ru-supported carbon catalyst powder (a value obtained from the O/N analyzer)
N: the amount of Pt—Ru included in a carrier (carbon) included in 1 g of Pt—Ru-supported carbon catalyst powder (a value obtained by analyzing carbon only by the O/N analyzer)

Figure 3:
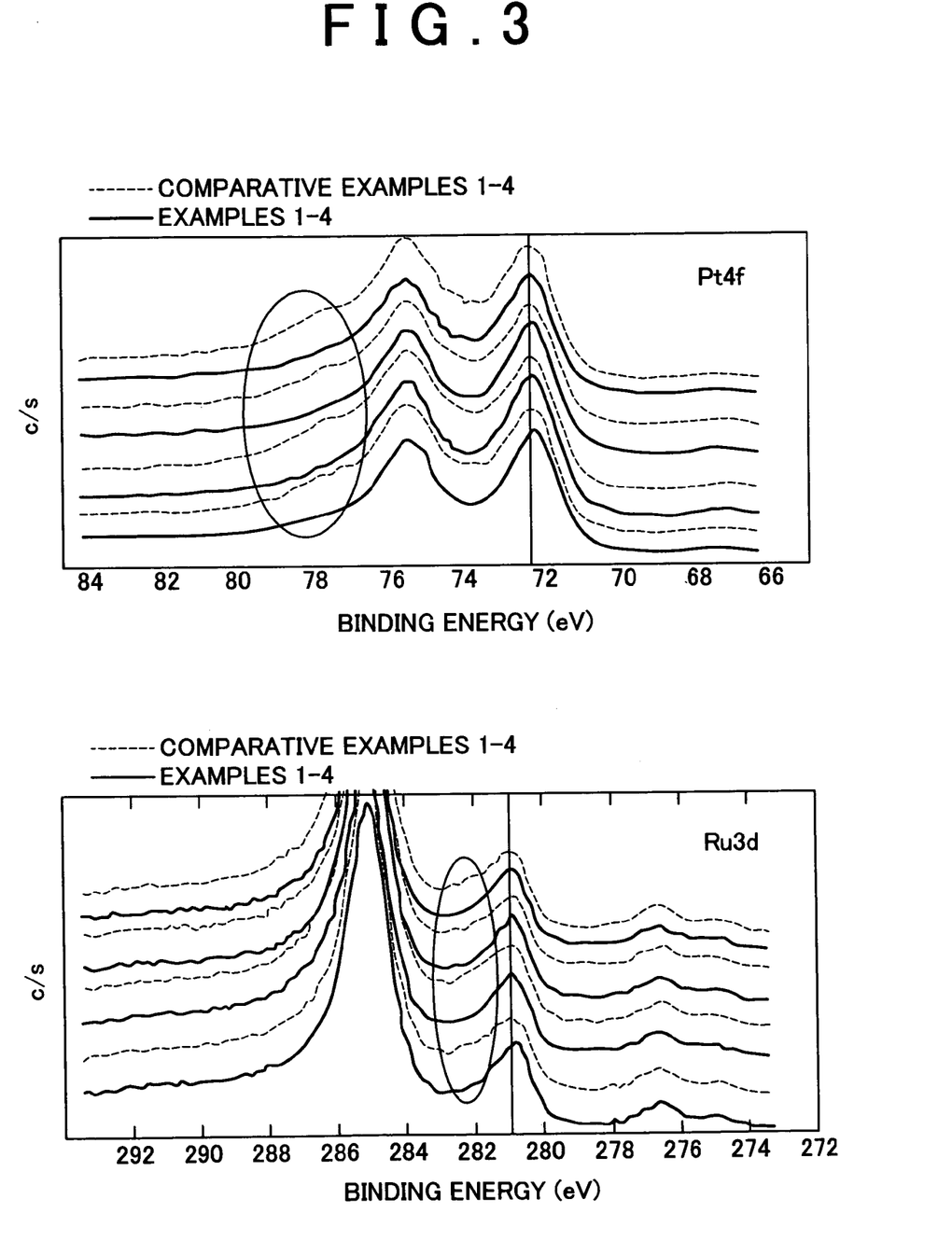
FIG. 3 is an XPS spectrum of test samples in the examples.
Figure 4:
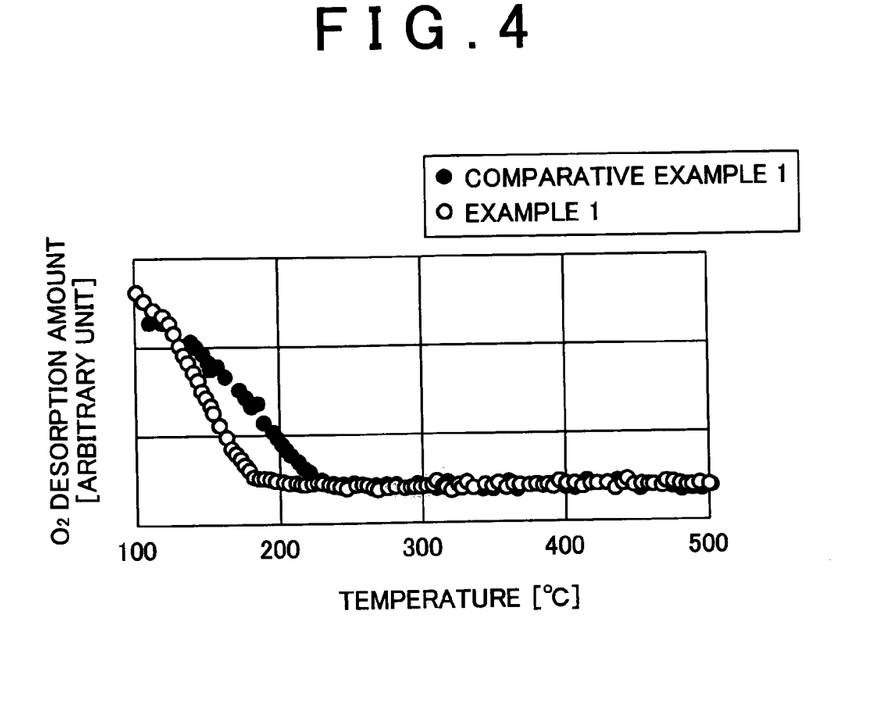
FIG. 4 is a diagram that shows TPD analysis results of an example 1 and a comparative example 1.

The electron state on the surface of each test sample is measured by XPS, and a result thereof is shown in FIG. 3. FIG. 4 shows a result of a TPD (temperature programmed desorption) analysis conducted on the test samples of example 1 and comparative example 1. A range of temperature variation was set to 100 to 500° C.

[Measurement of a CO Poisoning Resistance]

A fuel cell using each test sample as a fuel cell electrocatalyst was prepared. A fuel oxygen cell is made by sandwiching an electrolyte membrane (Nafion 112: produced by DuPont) between an anode and a cathode and further sandwiching both faces between two separators. The anode and cathode were prepared by applying and drying a paste, made by dispersing each test sample into an electrolyte solution (Nafion112: produced by DuPont), onto a sheet made of Teflon (registered trademark) such that the amount of Pt becomes 0.2 mg/cm$^2$. Then, the anode and cathode were thermally transferred to the electrolyte membrane to produce a fuel cell. The paste was dried in a vacuum atmosphere to prevent oxidization of the catalyst layer. The separator is housed in a resin separator casing such that fuel gas and the air are efficiently supplied to the surface of the electrode. In this case, the area of the electrode was 13 cm$^2$ (36 mm×36 mm).

Hydrogen gas was used as fuel gas (anode) and oxygen was used as reaction gas (cathode) to make the aforementioned fuel cell generate electric power. Conditions for electric power generation were to keep a cell temperature at 80° C. (the temperature of a fuel-side humidifier was 85° C., and the temperature of an air-side humidifier was 70° C.), supply the fuel gas at 0.5 L/minute under pressure of $1.0 \times 10^5$ Pa, and supply the air at a flow rate of 1.0 L/minute under pressure of $0.5 \times 10^5$ Pa. A load was adjusted such that a current flowing from the fuel cell is 0.5 A.

200 ppm of carbon monoxide was added into the fuel gas, and a change in a terminal voltage of the fuel cell before and after addition of carbon monoxide (pure hydrogen ratio: $V/V_0 \times 100$ (%), where V is a terminal voltage at the time of addition of carbon monoxide, and $V_0$ is a terminal voltage before addition of carbon monoxide) was measured. A result is also shown in Table 1. In addition, a relation between the oxygen content of the catalyst layer and a pure hydrogen ratio of each test sample is shown in FIG. 5.

Figure 5:
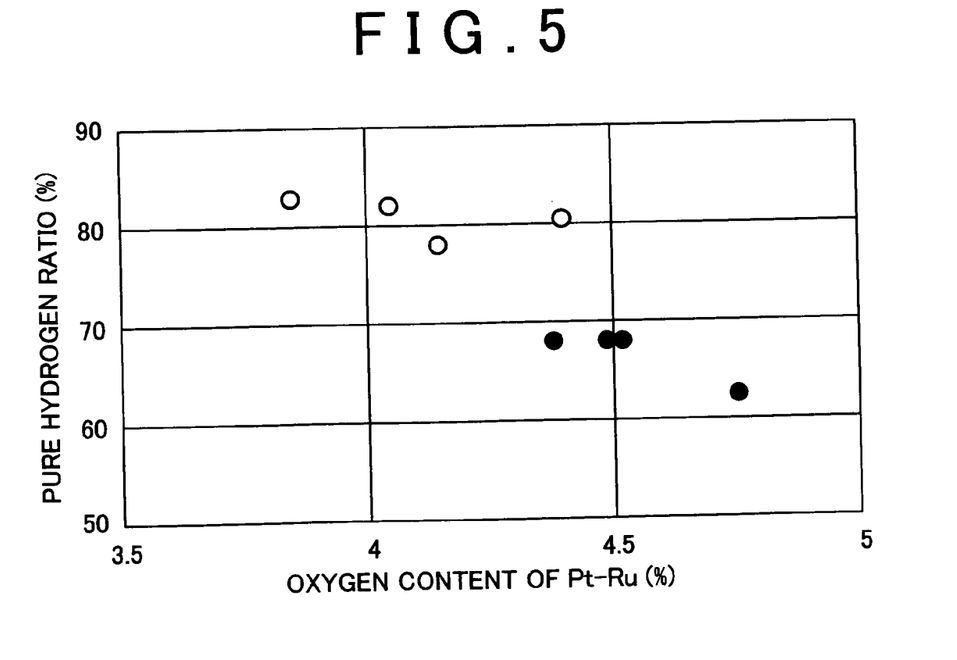
FIG. 5 is a diagram that shows a relation between the oxygen content of a catalyst layer and a pure hydrogen ratio of a test sample in an example.

As is apparent from Table 1 and FIG. 5, the oxygen content in the test sample of each example (○) was 4.4 wt % or less, whereas that in the test sample of each comparative example (●) was more than 4.4 wt %. The hydrogen ratio was approximately 75 to 85% in each example whereas it was approximately 60 to 70% in each comparative example, indicating that the hydrogen ratio of the fuel cells using the test samples of the examples was higher than that in the comparative examples by approximately 15%. That is, when the oxygen content of the Pt—Ru alloy forming the catalyst layer was approximately 4.4 wt %, a significant difference was observed in the CO poisoning resistance. In particular, when the oxygen content was 4.2 wt % or less, the value of the hydrogen ratio was absolutely high.

It can be considered that the difference between each example and each comparative example depends on the surface state of the Pt—Ru alloy forming the catalyst layer. This can also be assumed from the XPS measurement results. That is, as is apparent from FIG. 3 that shows a comparison between XPS spectrums (dot lines) of the test samples of the respective comparative examples and spectrums (solid lines) of the test samples of the respective examples, small peaks were observed, in the comparative examples, near 78 eV corresponding to a 4f orbit of Pt and near 282 to 283 eV corresponding to a 3d orbit of Ru. This indicates that the electron state of the surface in the comparative example was changed when compared to that in the respective examples. The change in the electron state of the surface is considered to be resulted from bonding of oxygen to the Pt—Ru alloy.

Also, from a fact that desorption of more oxygen is observed in the test samples of the comparative examples as compared with the test samples of the examples as a result of the TPD analysis (FIG. 4), it can be assumed that more oxygen is bonded in the test samples of the comparative examples than those of the examples. Moreover, oxygen is desorbed at higher temperatures in the test samples of the comparative examples than those of the examples, thus indicating that the oxygen bonding is firmer. Accordingly, it can be assumed that the test samples of the comparative examples are more affected by oxygen.

Furthermore, it can be presumed that oxygen detected by the O/N elementary analysis was bonded to the surface of the Pt—Ru alloy. This is also apparent from the results of the XPS and TRD analysis.

As described above, with regard to the fuel cell electrocatalyst of the invention, by controlling the amount of oxygen contained in a catalyst layer to a predetermined value or less, the CO poisoning resistance of the catalyst was improved. Moreover, with regard to the method of producing the fuel cell electrocatalyst of the invention, by properly controlling the oxygen content of the catalyst layer and producing the fuel cell electrocatalyst, the CO poisoning resistance was improved.

What is claimed is:

1. A fuel cell electrocatalyst comprising:
   a carrier; and
   a catalyst layer made of a plurality of Pt—Ru alloy particles supported on the carrier, wherein an oxygen content in an entirety of at least one particle is between 3.87 wt % and 4.4 wt %.

2. A method of producing a fuel cell electrocatalyst comprising:
   a supporting step of supporting a catalyst layer made of a plurality of particles of an alloy including Pt and Ru on a carrier; and
   an oxygen content regulating step of reducing an oxygen content in at least one particle in its entirety to between 3.87 wt % and 4.4 wt %.

3. The method of producing a fuel cell electrocatalyst according to claim 2, wherein:
   the oxygen content regulating step reduces the oxygen content to between 3.87 wt % and 4.4 wt % in the plurality of particles.

4. The method of producing a fuel cell electrocatalyst according to claim 2, wherein:
   the supporting step includes a heating step of heating the catalyst layer, and the oxygen content regulating step is a step of keeping the catalyst layer in a non-oxidizing atmospheric state in the heating step.

5. The method of producing a fuel cell electrocatalyst according to claim 4, wherein:
   the non-oxidizing atmospheric state in the oxygen content regulating step is a state in which a non-oxidizing substance is adsorbed on a surface of the catalyst layer.

6. The method of producing a fuel cell electrocatalyst according to claim 4, wherein:
   the non-oxidizing atmospheric state is a reducing atmospheric state.

7. A fuel cell electrocatalyst according to claim 1, wherein the oxygen content in the entirety of each particle in the plurality of particles is between 3.87 wt. % and 4.4 wt.

8. A fuel cell electrocatalyst according to claim 1, wherein said at least one particle has a diameter of 3.5 nm.

9. A fuel cell electrocatalyst according to claim 8, wherein an allowable oxygen content of said catalyst is between 3.87 wt. % and 4.4 wt. %.

* * * * *

UNITED STATES PATENT AND TRADEMARK OFFICE
CERTIFICATE OF CORRECTION

PATENT NO. : 7,037,873 B2
APPLICATION NO. : 10/570600
DATED : May 2, 2006
INVENTOR(S) : Hisano Kato It is certified that error appears in the above-identified patent and that said Letters Patent is hereby corrected as shown below:

On Title Page, Item [73], in the Assignee, line 1, "Jicosha" should read --Jidosha--.

col. 14, line 38, "4.4 wt." should read --4.4 wt. %--.

col. 14, line 42, after "catalyst", insert --layer--.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO.        : 7,037,873 B2
APPLICATION NO.   : 10/670600
DATED             : May 2, 2006
INVENTOR(S)       : Hisano Kato It is certified that error appears in the above-identified patent and that said Letters Patent is hereby corrected as shown below:

On Title Page, Item [73], in the Assignee, line 1, "Jicosha" should read --Jidosha--.

col. 14, line 38, "4.4 wt." should read --4.4 wt. %--.

col. 14, line 42, after "catalyst", insert --layer--.

This certificate supersedes Certificate of Correction issued September 5, 2006.

Signed and Sealed this

Seventh Day of November, 2006

JON W. DUDAS
*Director of the United States Patent and Trademark Office*